United States Patent [19]

Deguchi et al.

[11] Patent Number: 4,609,267

[45] Date of Patent: Sep. 2, 1986

[54] SYNTHETIC RESIN LENS AND ANTIREFLECTION COATING

[75] Inventors: Hirokazu Deguchi, Suwa; Kenji Kojima, Nagano; Takao Mogami, Suwa, all of Japan

[73] Assignee: Seiko Epson Corporation, Tokyo, Japan

[21] Appl. No.: 333,519

[22] Filed: Dec. 22, 1981

[30] Foreign Application Priority Data

Dec. 22, 1980 [JP] Japan .................. 55-181687
Aug. 28, 1981 [JP] Japan .................. 56-135044

[51] Int. Cl.⁴ .............. G02B 5/28; G02B 1/10; G02C 7/10; B05D 3/00
[52] U.S. Cl. .................. 351/163; 350/1.6; 350/164; 350/165; 350/166; 351/166; 351/177; 427/294
[58] Field of Search .............. 350/164–166, 350/1.6, 1.7; 351/163, 166, 177; 427/294

[56] References Cited

U.S. PATENT DOCUMENTS

| | | | |
|---|---|---|---|
| 3,516,720 | 6/1970 | Mauer | 350/165 X |
| 3,787,234 | 1/1974 | Smiley et al. | 350/164 X |
| 4,070,097 | 1/1978 | Gelber | 350/165 |
| 4,168,113 | 9/1979 | Chang et al. | 350/165 X |
| 4,196,246 | 4/1980 | Takayama et al. | 350/165 X |

*Primary Examiner*—John K. Corbin
*Assistant Examiner*—Scott J. Sugarman
*Attorney, Agent, or Firm*—Blum Kaplan Friedman Silberman and Beran

[57] ABSTRACT

A synthetic resin lens having a refractive index of at least 1.55 and an antireflection coating thereon is provided. The antireflection coating includes at least a hard coat layer formed of a dielectric substance having a refractive index $n_h$ disposed on the lens having a refractive index $n_s$ ($n_s \neq n_h$) and at least one antireflection layer of a dielectric or metallic material disposed between the lens and the hard coat layer. The antireflection layer has a refractive index n in the range represented by the formula:

$$\sqrt{n_s \times n_h} + \frac{|n_s - n_h|}{4} \geq n \geq \sqrt{n_s \times n_h} - \frac{|n_s - n_h|}{4}$$

and an optical film thickness of 4 (where denotes a wavelength in the range between about 450 nm to 650 nm) or two or more plies optically equivalent to a single layer of the antireflection material. The synthetic resin lens may be prepared by radical polmerization of a mixed monomer solution of styrene, 2,2-bis[3,5-dibromo-4-(2-methacryloloxyethoxy)phenyl]propane, and ultraviolet absorber and a light stabilizer. Such synthetic resin lenses generally have a refractive index of about 1.6 and a surface hardening layer usually $SiO_2$ has a refractive index of about 1.46. It is desirable to provide an antireflection layer having a refractive index of about 1.52 which may be provided by a first layer of silicon dioxide and another layer of an oxide selected from the group of oxides of $ZrO_2$, $HfO_2$, $Ti_2O_3$, $TiO_2$, $Ta_2O_5$, $Si_3N_4$, $Yb_2O_3$, $Y_2O_3$ or $Al_2O_3$. An outer antireflection layer is then disposed on the outer surface of the surface hardening layer.

12 Claims, 6 Drawing Figures

FIG. 5
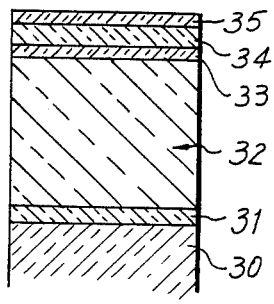
FIG. 6
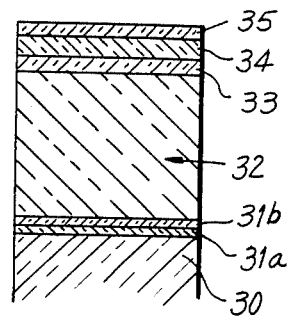
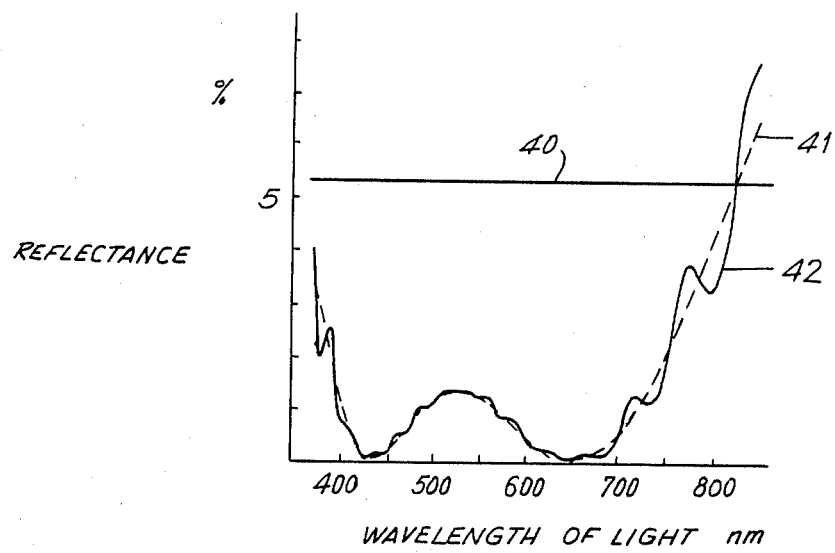
FIG. 4

SYNTHETIC RESIN LENS AND ANTIREFLECTION COATING

BACKGROUND OF THE INVENTION

This invention relates to synthetic resin lens having relative high refractive indices, and more particularly to such synthetic resin lens having an antireflection coating including a hard coat layer and an antireflection layer to reduce reflection occurring at the interface between the lens and hard coat layer.

In recent years, lenses made from synthetic resin materials, such as diethylene glycol bisallycarbonate and polymethyl methacrylate have found wide acceptance in place of lenses formed of inorganic glass. Such lenses are used particularly for spectacles as lenses of synthetic resin are significantly less breakable than glass lenses. Accordingly, they have been favorably accepted as a matter of safety. More recently, lenses of reduced thickness using resins having higher refractive indices have been developed. The appearance of these latter lenses has eliminated the disadvantage previously found with synthetic resin lenses. This shortcoming related to the inevitability of having a lens of greater thickness than that of an organic glass.

Synthetic resin lenses are also popular where the lightweight of the lens is of interest. This characteristic makes a synthetic lens outstanding for use as a spectacle lens. Over the past ten years there has been a sharp increase in the number of persons who prefer spectacle utilizing synthetic resin lenses. These lenses are by far lighter in weight than organic glass lenses and provide a higher degree of wearing comfort. As noted above, such synthetic lenses for sight correction are formed mainly of diethylene glycol bisallycarbonate. This resin has a relatively high degree of mar resistance and is relatively easy to dye. A lens of this resin has a greater center and edge thickness than an inorganic glass lens. In particular, users tend to complain about a strong minus lens having too large a shingle thickness.

The advantages of the synthetic resin lenses noted above account for the fact that they are rapidly taking the place of inorganic glass lenses. Even though the synthetic lenses do enjoy the high impact resistance and light weight, they do tend to scratch or scar more readily than inorganic glass lenses. In an effort to overcome this shortcoming, the practice has been adopted of depositing a hard coat film of an organic or inorganic substance on the surface of a synthetic resin lens. Particularly in the case of spectacle lenses, the synthetic resin lenses are coated with antireflection coatings which serve as a hard coat. Such lenses are currently available commercially. These antireflection coatings generally have a film construction as illustrated in FIG. 1 and include a hard coat layer 11 and an antireflection layer 12 superimposed on the surface of a lens 10 made of synthetic resin.

Hard coat layer 11, more often than not, is formed of silicon dioxide. This is done because silicon dioxide is capable of quickly forming a film of good quality when vacuum deposited by use of electron beams. Silicon dioxide has a refractive index between 1.44 to 1.46, which is low compared with the refractive indices of lenses formed from ordinary synthetic resins. When antireflection layer 12 is superimposed on hard coat layer 11 of silicon dioxide, hard coat layer 11 has an adverse effect upon the properties of antireflection layer 12. Specifically, reflection occurs at the interface between lens 10 and hard coat layer 11 due to the difference between the refractive indices of the two adjacent materials. This results in an interference wave which forms overlaps in the spectral reflectance property of antireflection layer 12.

This spectral reflectance property including a ripple denoted by 21 is shown in FIG. 2. The size of ripple 21 increases in proportion to the difference between the refractive index lens 10 and that of hard coat layer 11 increases. When hard coat layer 11 is formed of silicon dioxide which has a refractive index of about 1.46 and lens 10 is made of a synthetic resin having a high refractive index of about 1.60, for example, the difference between the refractive indices is 0.14. Consequently, the height of ripple 21 approaches 2%. Attempts to lower the reflectance on one surface of lens 10 to less than 2% by means of antireflection film 12 have not been successful.

One possible solution to this problem may lie in using dielectric substances for the hard coat layer which have the same refractive index as the synthetic resin lens. The use of such dielectric substance would overcome reflection at the interface between hard coat layer 11 and synthetic resin lens 10, and consequently eliminate ripple 21. In actual practice, however, there is no known dielectric substance which has the same refractive index as the synthetic resin lens and the ability to form quickly a vacuum-deposited film of acceptable quality.

Accordingly, it is desirable to provide a lens made of a synthetic resin material having a antireflection coating including a hard coat layer which overcomes these problems of the prior art. Further, such lenses should exhibit outstanding antireflection properties and be able to be formed by any of the conventional film-forming techniques, such as vacuum-deposition and spattering on a synthetic resin lens having a varying refractive index.

SUMMARY OF THE INVENTION

Generally speaking, in accordance with the invention, a synthetic resin lens having a high refractive index $n_s$ of at least 1.55 and a hard coat layer of a dielectric substance having a refractive index $n_h$ ($n_s \neq n_h$) disposed on the surface of the lens is provided. In order to reduce reflection at the interface between the synthetic resin lens and the hard coat layer at least a single ply antireflection layer of a dielectric or metallic substance is disposed between the synthetic resin lens and the hard coat layer.

The dielectric substance of the antireflection layer interposed between the synthetic resin lens and the hard coat layer has a refractive index n in the range represented by the formula (1):

$$\sqrt{n_s \times n_h} + \frac{|n_s - n_h|}{4} \geqq n \geqq \sqrt{n_s \times n_h} - \frac{|n_s - n_h|}{4} \quad (1)$$

and an optical film thickness of $\lambda/4$ (wherein, $\lambda$ denotes a wavelength in the range of from 450 nm to 650 nm) or a layer of two or more plys of dielectric optically equivalent to the single ply layer.

The synthetic resin lens bodies in accordance with the invention are formed by radical polymerization of a mixed monomer solution containing between about 30 to 50 parts by weight of styrene, about 40 to 70 parts by weight of 2,2-bis[3,5-dibromo-4-(2-methyacryloyloxyethoxy)phenyl]propane, about 0.01 to 2.0 parts by weight of an ultraviolet light absorber and about 0.01 to 2.0 parts by weight of a light stabilizer to provide a synthetic resin lens having a refractive index of from about 1.58 to 1.61. A film of silicon dioxide having a thickness between about 1 to 6 μm may be disposed on the surface to improve mar resistance. An antireflection coating of layers of substances having a high refractive index and a substance having a low refractive index may be applied to the outer surface of the hard coat layer. This results in a lens having an improved reflectance, but ripples in the spectral reflectance characteristics are still present. In order to eliminate the ripples and obtain an improved antireflective properties, an antireflection layer is disposed between the synthetic resin lens body and the surface hardening layer. This antireflection layer is formed by a first layer of silicon dioxide having an optical thickness of from 0.05 to $0.15\lambda_0$ ($\lambda_0$ being a design wavelength of from 400 to 700 nm) and placing thereon a further layer having an optical thickness of 0.01 to $0.15\lambda_0$. The latter layer is formed of a material selected from the group consisting of $ZrO_2$, $HfO_2$, $Ti_2O_3$, $TiO_2$, $Ta_2O_5$, $Si_3N_4$, $Yb_2O_3$, $Y_2O_3$ or $Al_2O_3$.

Accordingly, it is an object of the invention to provide an improved synthetic resin lens having a high refractive index.

It is another object of the invention to provide improved synthetic resin lens having a high refractive index and a surface hard coat layer.

It is another object of the invention to provide an improved synthetic resin lens having a surface hard coat layer and an antireflection coating on the outer surface of the hard coat layer.

Still another object of the invention is to provide an improved synthetic resin lens having a high refractive index and a hard coat layer thereon and improved antireflection properties.

Still a further object of the invention is to provide an improved synthetic resin lens having a high refractive index and a hard coat layer disposed thereon and an antireflection layer disposed between the synthetic resin lens and the hard coat layer.

Yet another object of the invention is to provide an improved synthetic resin lens having a high refractive index and a hard coat layer disposed thereon with an improved anti-reflection coatings disposed between the synthetic resin lens and the surface hard coat layer and on the outer surface of the hard coat layer.

Still another object of the invention is to provide a method for preparing synthetic resin lenses having high refractive indices and improved antireflection properties.

Still other objects and advantages of the invention will in part be obvious and will in part be apparent from the specification.

The invention according comprises the several steps and the relation of one or more of such steps with respect to each of the others, and the articles possessing the features, properties and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is graphical illustration showing the spectral reflectance of lenses prepared in accordance with the invention;

FIG. 5 is cross-sectional illustration of a synthetic resin lens having antireflection coatings in accordance with another embodiment of the invention; and FIG. 6 is a cross-sectional illustration showing a synthetic resin lens having antireflection coating in accordance with yet another embodiment of the invention.

DESCRIPTION OF THE PREFERRED EMBODIMENTS

A synthetic resin for forming a synthetic resin lens having a relatively high refractive index in accordance with the invention must be a resin capable of receiving a metal oxide film by vacuum evaporation. Such synthetic resins may be obtained by radical polymerization of mixed monomer solutions as follows. The solutions contain about 30 to 50 parts by weight of styrene, 40 to 70 parts by weight of 2,2-bis[3,5-dibromo-4-(2-methyacryloyloxyethoxy)phenyl]propane, 0.01 to 2.0 parts by weight of an ultraviolet light absorber and 0.01 to 2.0 parts by weight of a light stabilizer. Such mixed monomer solutions provide resins having a refractive index between about 1.58 and 1.61. These resins are easily worked and have high chemical resistance in view of the degree of crosslinking.

It is difficult to increase the quantity of the 2,2-bis[3,5-dibromo-4-(2-methacryloyloxyethoxy)phenyl]propane beyond the above noted range to increase the degree of crosslinking of the resin, as it is a white solid at ordinary room temperature and can be dissolved in styrene only to a limited extent. The thermal polymerization molding of a lens in a glass mold and gasket can be facilitated if between about 1 to 5 parts by weight of diethylene glycol bisallylcarbonate and about 0.5 to 5 parts by weight of ethylene glycol diglycidyl ether dimethacrylate are added to the mixed monomer solution. Additionally, it is appropriate to employ a prester as a polymerization initiator.

It is known to form a film of $SiO_2$ on a synthetic resin lens surface by vacuum evaporation to harden the surface of the lens. The lenses prepared in accordance with the invention also employ a layer of $SiO_2$ having a thickness of about 1 to 6 μm on the lens surface to improve its mar resistance. However, the invention overcomes the reflectance difficulties of the prior art lenses. The resins utilized in accordance with the invention are capable of adhering closely to an evaporated film of a metal oxide. Therefore, its mar resistance can easily be improved, if for example, a film of $SiO_2$ is formed thereon by vacuum deposition. Although the thickness of the surface hardening layer of $SiO_2$ depends on the use in which the lens will be placed, a coating of $SiO_2$ is fully effective if it has a minimum thickness of about 1 μm. Thickness exceeding 6 μm are of no significance.

Figure 1:
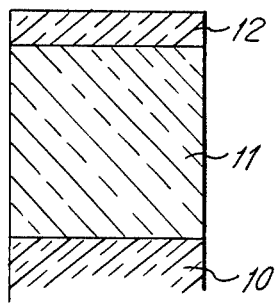
FIG. 1 is a cross-sectional illustration of a synthetic resin lens including a hard coat layer of $SiO_2$ and an outer antireflection layer.

Referring specifically to FIG. 1, a synthetic resin lens 10 having a surface hardening layer 11 of $SiO_2$ is shown.

The reflectance characteristics of such a lens is shown by a line 40 of FIG. 4. In order to reduce the amount of reflectance, an antireflection coating 12 formed of a metal oxide and a metal nitride is provided on surface hardening layer 11 of $SiO_2$. Antireflection coating 12 is formed of a substance having a high refractive index and a substance having a low refractive index. The substance having a high refractive index is a material selected from the group consisting of $ZrO_2$, $HfO_2$, $Ti_2O_3$, $TiO_2$, $Ta_2O_5$, $Y_2O_3$, $Yb_2O_3$, $Si_3N_4$ and $Al_2O_3$. The substance having a lower refractive index is $SiO_2$.

Figure 3:
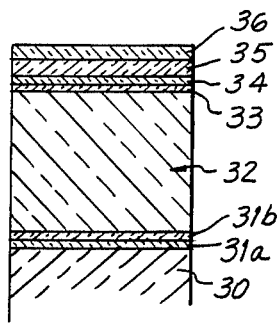
FIG. 3 is a cross-sectional illustration of a lens including the antireflection coating in accordance with one embodiment of the invention.

In accordance with a first embodiment of the invention antireflection coating 12 is formed of four layers identified as elements 33 to 36 in FIG. 3. First layer 33 has an optical thickness of between about 0.07 to $0.25\lambda_0$, wherein $\lambda_0$ is a design wavelength of between 400 to 700 nm. Layer 33 is formed of one of $ZrO_2$, $HfO_2$, $Ti_2O_3$, $TiO_2$, $Ta_2O_5$, $Y_2O_3$, $Yb_2O_3$ or $Si_3N_4$. Second layer 34 has an optical thickness of about 0.2 to $0.15\lambda_0$ and is formed of $SiO_2$. Third layer 35 has an optical thickness of from about 0.2 to $0.5\lambda_0$ and is formed of $ZrO_2$, $HfO_2$, $TiO_2$, $Ti_2O_3$, $Ta_2O_5$ or $Si_3N_4$. Fourth layer 36 has an optical thickness of about 0.2 to $0.3\lambda_0$ and is formed of $SiO_2$.

Each of the substances of layers 33 to 36 forms a strong film by vacuum deposition or ion plating at temperatures within the limitations of the resin, namely not exceeding 130° C. The thickness of each layer 33 to 36 is of course selected to suit the particular antireflection properties required. It is generally preferable that the thickness be in the order of $\lambda/4$-$\lambda/2$-$\lambda/4$ or $\lambda/4$-$\lambda/4$-$\lambda/4$.

Figure 2:
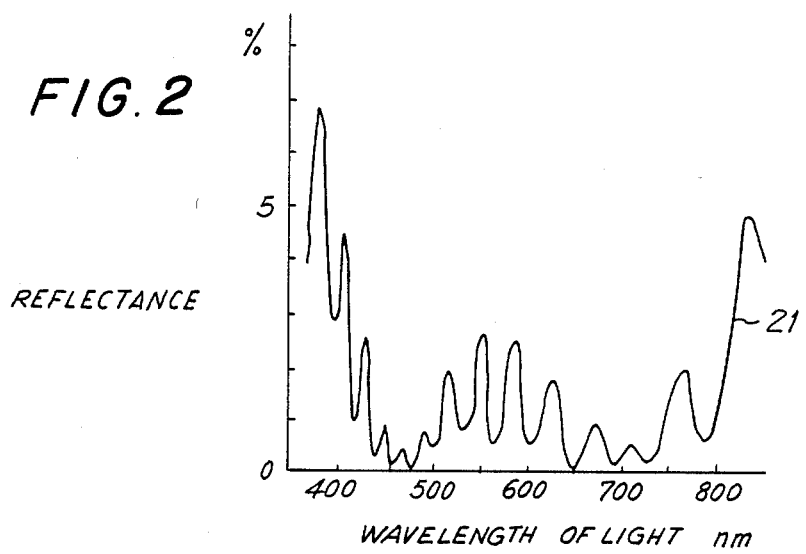
FIG. 2 is a graph illustrating the spectral reflectance of the lens illustratin in FIG. 1 for a synthetic resin having a refractive index of about 1.60.

As noted above, FIG. 1 shows synthetic resin lens 10 in accordance with the invention having thereon surface hardening layer 11 of $SiO_2$ and a 4-layer antireflection coating 12. Curve 21 in FIG. 2 represents the spectral reflectance of the lens surface. The pluarlity of ripples indicate the incomplete antireflective properties of the lens. This is due to a high degree of reflection between resin lens 10 and hard coat layer 11, since there is a difference of nearly 0.15 in refractive indices therebetween. Resin lens 10 has a refractive index of about 1.6 whereas $SiO_2$ has a refracitve index between 1.44 to 1.46. In order to eliminate the ripples and obtain a lens having further improved antireflective properties, the invention utilizes an antireflection layer disposed between resin lens 10 and hard coat layer 11.

Since resin lens 10 has a refractive index of 1.6 and surface hardening layer 11 has a refractive index of 1.46, it is most suitable to provide therebetween an antireflection layer having a refractive index of 1.52. This value is obtained in accordance with the equation:

$$n = \sqrt{1.46 \times 1.6} = 1.52$$

and an optical thickness of $0.25\lambda_0$. As a matter of fact, substances having a refractive index of 1.52 which form an acceptable antireflection layer by evaporation are not available. Accordingly, the invention contemplates forming an equivalent layer on a synthetic resin lens by the use of multiple plies.

Referring specifically to FIG. 3, an antireflection layer 31 equivalent to a layer having a reflective index of 1.52 is formed on a synthetic resin lens 30. A first ply 31a of $SiO_2$ having an optical thickness of 0.5 to $0.15\lambda_0$ is formed on lens 30 and a second ply 31b having an optical thickness of 0.01 to $0.15\lambda_0$ and formed of $ZrO_2$, $HfO_2$, $Ti_2O_3$, $TiO_2$, $Ta_2O_5$, $Si_3N_4$, $Yb_2O_3$, $Y_2O_3$ or $Al_2O_3$ is formed on first ply 31a. This antireflection layer 31 substantially eliminates the ripples caused by hard coat layer 11 of $SiO_2$ and provides satisfactory antireflection properties as illustrated by a curve 41 in FIG. 4.

Preparation of a synthetic resin lens having a relatively high refractive index in accordance with the invention will now be described in detail by way of example. This and the further examples presented herein are presented as merely illustrative of the invention and not intended in a limiting sense.

EXAMPLE 1

A mixed monomer solution containing 37.3 parts by weight of styrene, 58.8 parts by weight of 2,2-bis[3,5-dibromo-4-(2-methacryloyloxyethoxy)phenyl]propane, 3.1 parts by weight of diethylene glycol bisallylcarbonate, 0.8 parts by weight of ethylene glycol diglycidyl ether dimethacrylate, 0.1 parts by weight of 2-(2'-hydroxy-5'-methyl-phenyl)-benzotriazole as an ultraviolet light absorber, and 0.1 parts by weight of bis(2,2,6,6-tetramethyl-4-piperidine)sebacate as a light stabilizer was polymerized in a mold defined by a glass mold and a gasket in the presence of t-butylperoxyneodecanate as a polymerization initiator. The mold was of the type capable of forming a lens having a −6.00 diopter power by employing diethylene glycol bisallylcarbonate.

After the polymerization reaction was complete, an antireflective film of the type shown in FIG. 3 was formed on the lens by vacuum deposition. The thickness of each layer and the substance employed therein with reference to the reference numerals of FIG. 3 were as follows:

| Ply | Substance | Thickness |
|---|---|---|
|  |  | ($\lambda 0$ = 530 nm) |
| 31a | $SiO_2$ | 0.12 $\lambda 0$ |
| 31b | $ZrO_2$ | 0.02 $\lambda 0$ |
| 32 | $SiO_2$ | 3 $\mu$m |
| 33 | $ZrO_2$ | 1.12 $\lambda 0$ |
| 34 | $SiO_2$ | 0.056 $\lambda 0$ |
| 35 | $ZrO_2$ | 0.25 $\lambda 0$ |
| 36 | $SiO_2$ | 0.25 0 |

The spectral reflectance of one surface of the lens prepared in accordance with this Example 1 is shown as curve 41 in FIG. 4. Most of the ripples present in FIG. 2 were not observed. Line 40 indicates the surface reflectance of the resin without the antireflective layer in accordance with the invention.

A lens prepared in accordance with this Example 1 and a lens of diethylene glycol bisallylcarbonate (Lens A) were prepared by polymerization in the same glass mold and gasket. The following Table 1 compares their physical properties:

TABLE 1

|  | Lens of this invention | Lens A |
|---|---|---|
| Refractive index | 1.595 | 1.50 |
| Abbe's number | 32 | 57 |
| Diopter | −7.50 | −6.00 |
| Steel wool properties | A | D' |
| Wire brush properties | C | C' |
| Light transmittance | 98% | 92% |

Table 1 makes it clear that a lens prepared in accordance with the invention is of reduced thickness, possesses superior optical properties and mar resistance than the conventional diethylene glycol bisallylcarbonate-type lens. The "steel wool properties" represent a valuation in ten grades from A to E' of the lens surface against which a #000 gage steel wool is rubbed under a load of 1 kg. Grade A indicates the highest mar resistance. The "wire brush properties" represent a result of a similar mar resistance test utilizing a wire bush instead of steel wool.

As noted above, the interference with the antireflection properties indicated by the ripples in FIG. 2 result from the hard coat layer and are attributable to reflection which occurs at the interface between the synthetic resin lens and the hard coat layer due to the difference between the refractive indices of the two substances. It follows, therefore, that the ripples should cease to exist when this reflection is eliminated or alleviated. The present invention contemplates reduction of the ripples which interfere with antireflection properaties by disposing an antireflection layer interposed between the hard coat layer and the synthetic resin lens by reducing the reflection at this interface.

Although various layer constructions are conceivable for this antireflection layer, the simplest mono-ply ¼ wavelength layer proves to be both effective and practicable. When a layer having a refractive index of n which equivalent to $\sqrt{n_s \times n_h}$ (wherein $n_s$ represents the refractive index of the synthetic lens and $n_h$ represents the refractive index of the hard coat layer) and a layer thickenss of $\lambda/4$ (wherein $\lambda$ stands for a wavelength in the range of from about 450 nm to 650 nm) is interposed between the synthetic resin lens and the hard coat layer, the reflection at the interface of light of the wavelength can be eliminated and the reflection of the whole visible light at the interface can be reduced to less than one-half. Accordingly, the ripples interfering with the antireflection properties can be substantially eliminated for light having a wavelength about wavelength $\lambda$.

By incorporating this particular antireflection layer, an antireflection coating can be produced which exhibits antireflection properties substantially equivalent to the antireflection properties of the layer without the hard coat layer. As noted above, from a practical point of view it is difficult to obtain a $\lambda/4$ layer having a refractive index exactly equal to $\sqrt{n_s \times n_h}$. It has been found that a layer is effective so long as the refractive index n has a value which falls within the range of from about $$\sqrt{n_s \times n_h} + \frac{|n_s - n_h|}{4} \text{ to } \sqrt{n_s \times n_h} - \frac{|n_s - n_h|}{4}.$$

Such an interposed antireflection layer sufficiently fulfills its purpose of reducing the ripples as shown in FIG. 2. Moreover, when a single ply layer cannot be formed having a $\lambda/4$ thickness with the desired refractive index n, a layer providing the same effect may be formed by alternately stratifying the two substances having different refractive indices in two or more plies. A multi-ply antireflection layer may be formed of three plies of $\lambda/4$, $\lambda/2$ and $\lambda/4$ in thickness may be used to accomplish elimination of the ripples in accordance with the objects of this invention. Of course, formation of such a multi-ply layer takes more time and labor than involved with less plies.

In accordance with this embodiment of the invention, the antireflection coating disposed in the interface between the hard coat layer and the synthetic resin lens is designed in accordance with the following procedures. This antireflection layer need not be restricted solely to suit the best synthetic resin lens having a refractive index $n_s$. The antireflective layer need only be designed to suit a synthetic resin lens having a refractive index of $n_f$ and a reflectance $R_f$ on one surface, provided that $R_f$ has the following value:

$$R_f = \left( \frac{n^2 - n_0 n}{n^2 + n_0 n_s} \right)^2. \tag{3}$$

In the above formula (3), n represents $\sqrt{n_s \times n_h}$, $n_o$ represents the refractive index of air which is 1 and $n_s$ represents the refractive index of the synthethic resin lens. The value of the reflectance Rf can be calculated by the following formula when the value of $n_f$ is known:

$$n_f = \frac{1 + r_f}{1 - R_f}. \tag{4}$$

Depositing the antireflection layer in accordance with this embodiment on a synthetic resin lens having a refractive index $n_s$ and superimposing a hard coat layer of refractive $n_h$ on the antireflection layer may well be regarded as the equivalent of a lens having a refractive index of $n_f$. Even when $n_s > n_h$ is satisfied and $n_s$ assumes a large value in the region of 1.6, the composite may be regarded as equivalent to a lens having a low refractive index of 1.46 when $n_h$ has a small value of 1.46 as in the case of silicon dioxide. These advantages obtained in accordance with the present invention will now be described in the further working examples.

EXAMPLE 2

A mixed liquid monomer solution of 70 mol percent styrene, 23 mol percent of a substance having the following formula A:

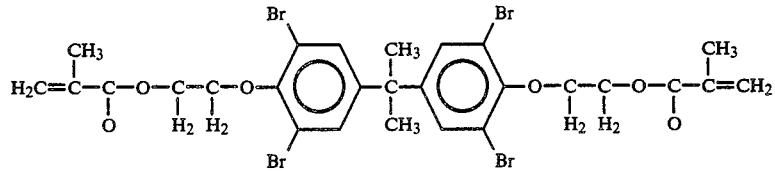

5 mol percent allyl cinnamate, 1 mol percent dietylene glycol bisallylcarbonate, 0.5 mol percent 2-(2'-hydroxy-5'-methylphenyl)-benzotriazole as an ultraviolet absorber and 0.5 mol percent lauroyl peroxide as a polymerization initiator was poured into a space defined by a gasket and two glass molds and subjected to thermal polymerization. Following completion of polymerization, antireflection layers of the type illustrated in FIG. 5 were deposited on each of the opposed surfaces of a resultant synthetic resin lens 30. Synthetic resin lens 30 had a refractive index of 1.598. A hard coat layer 32 of silicon dioxide in a thickness of 3 μm and a refractive index of 1.44 was to be formed on synthetic resin lens 30. In accordance with the invention, an interposed antireflection layer 31 having a refractive index of 1.517 (a value obtained by $\sqrt{1.598 \times 1.44}$) and an optical layer thickness of λ/4 (λ=530 nm) was formed between lens 30 and hard coat layer 32. Antireflection layer 31 was formed of a mixture of silicon dioxide and aluminum oxide.

After deposition of hard coat layer 32, lens 30 might well have been regarded as an equivalent to a synthetic resin lens having a refractive index of 1.44 in accordance with the aforenoted formulas (3) and (4). Layers 33–35 were accordingly selected for forming outer antireflection layers suitable for a lens having a refractive index of 1.44. Accordingly, ply 33 was formed of Yb$_2$O$_3$, ply 34 was formed of ZrO$_2$ and ply 35 was formed of SiO$_2$. The spectral reflectance properties of an antireflection layer formed on a lens having a refractive index of 1.44 is indicated by a curve 41 in the graph of FIG. 4. The spectral reflectance properties of the antireflection coating in accordance with this Example 2 are indicated by curve 42 in the same graph. It is noted, that the ripples present in FIG. 2 are suppressed to a great extent. Further, properties of the layers represented by the curves 41 and 42 are substantially equal to each other, indicating that the effect caused by hard coat layer 32 was substantially eliminated by virtue of antireflection layer 31.

The spectral reflectance properties of a lens without antireflection layer 31 in the interface between lens 30 and hard coat layer 32 were indicated by curve 21 in the graph of FIG. 2. As noted previously, the spectral properties contain a substantial number of ripples. Thus, an antireflection coating on a synthetic resin lens in accordance with the invention eliminated the expected reflectance characteristics. Curve 40 in the graph of FIG. 4 represents the surface reflection properties of the synthetic resin lens in accordance with the invention without any antireflection coating. Vacuum deposition of the antireflection coating in accordance with the invention serves to improve the optical properties of the lenses as described above, and at the same time enhances the resistance to marring and scratching substantially.

EXAMPLE 3

Antireflection layer 31 deposited at the interface between synthetic resin lens 30 and hard coat layer 31 in the construction of Example 2 was formed of a mixture of silicon dioxide and aluminum oxide. FIG. 6 illustrates the film construction in accordance with this further embodiment of this Example 3. A first ply of silicon dioxide 31a having an optical thickness of 58 nm and a second ply of aluminum oxide 31b having an optical thickness of 28 nm are formed. Two plies 31a and 31b, when taken together fulfill the same function as a monoply layer 31 in the construction of Example 2. The antireflection property of the lens prepared in accordance with this construction were equal to those of Example 2.

It is clearly noted in the above examples that the antireflection coating in accordance with the present invention decisively improves the surface reflection properties of a synthetic resin lens and enhances the lens resistance to being scratched to a great extent. The substances which are advantageously utilized in accordance with the invention include inorganic dielectric substances, such as oxides, fluorides, carbides, nitrides and acid nitrides of metals, and metals. It is also made clear in the foregoing description that lenses prepared in accordance with the invention are superior to any known synthetic resin lenses and optical properties, durability and appearance. Further, the lenses are suitable for use as eyeglasses lenses of the most modern designs which require high durability.

It will thus be seen that the objects set forth above, among those made apparent from the preceding description, are efficiently attained and, since certain changes may be made in carrying out the above process and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A synthetic resin lens construction having a high refractive index and improved antireflective and mar resistant properties, comprising:
   (1) a lens body formed of a cross-linked synthetic resin and having a refractive index $n_s$ of at least 1.55;
   (2) a dielectric substance for use as an antireflective layer having a refractive index n within the range represented by the formula:

$$\sqrt{n_s \times n_h} + \frac{|n_s - n_h|}{4} \geq n \geq \sqrt{n_s \times n_h} - \frac{|n_s - n_h|}{4}$$

and has an optical film thickness of λ/4, wherein λ denotes a wavelength in the range of from about 450 nm to 650 nm disposed on the surface of the lens body, and
   (3) a hard coat layer of about 1 to 6 μm thick having a refractive index $n_h$ disposed on the antireflective layer.

2. The synthetic resin lens construction of claim 1, wherein the first antireflective layer is a layer of two or more plies optically equivalent to said first antireflective layer.

3. The synthetic resin lens construction of claim 1 or 2, further including an outer antireflective layer disposed on the outer surface of the hard coat layer.

4. The synthetic resin lens construction of claim 3, wherein the outer antireflective layer has a refractive index suitable for a lens having a refractive index substantially equal to the refractive index of the hard coat layer.

5. The synthetic resin lens construction of claim 4, wherein the outer antireflective layer is of a three ply construction including a first ply of a material selected from the group consisting of ZrO$_2$, HfO$_2$, Ti$_2$O$_3$, TiO$_2$, Ta$_2$O$_5$, Y$_2$O$_3$, Yb$_2$O$_3$ or Si$_3$N$_4$ disposed on said hard coat layer, a second ply of material selected from the group consisting of ZrO$_2$, HfO$_2$, Ti$_2$O$_3$, TiO$_2$, Ta$_2$O$_5$ or Si$_3$N$_4$ disposed on said first ply, and a third ply of SiO$_2$ disposed on said second ply.

6. The synthetic resin lens construction of claim 5, wherein the outer antireflective layer is of a first ply of Yb$_2$O$_3$, a second ply of ZrO$_2$ dispersed thereon and the third ply of SiO$_2$.

7. The synthetic resin lens construction of claim 1, wherein the lens body is formed by radical polymerization of a mixed monomer solution of from about 30 to 50 parts by weight of styrene, 40 to 70 parts by weight of 2,2-bis[3,5-dibromo-4-(2-methacryloyloxyethoxy)-phenyl]propane, 0.01 to 2.0 parts by weight of an ultraviolet light absorber, and 0.01 to 2.0 parts by weight of a light stabilizer.

8. The synthetic resin lens construction of claim 7, wherein
   (a) the first interposed antireflective layer on the lens body surface includes (i) a first ply of SiO$_2$ having an optical thickness of 0.05 to 0.15$\lambda_0$, wherein $\lambda_0$ is a wavelength of from 400 to 700 nm and (ii) a second ply having an optical thickness of 0.01 to 0.15$\lambda_0$ disposed on said first ply and selected from the group consisting of ZrO$_2$, HfO$_2$, Ti$_2$O$_3$, TiO$_2$, Ta$_2$O$_5$, Y$_2$O$_3$, Si$_3$N$_4$ or Al$_2$O$_3$;
   (b) the hard coat layer disposed on the antireflective layer having a thickness of from 1 to 6 µm and being SiO$_2$; and
   (c) an outer antireflective layer disposed on the hard coat layer, including:
   (i) a fourth ply having an optical thickness of from 0.007 to 0.25$\lambda_0$, and of a material selected from the group consisting of ZrO$_2$, HfO$_2$, Ti$_2$O$_3$, TiO$_2$, Ta$_2$O$_5$, Y$_2$O$_3$, Yb$_2$O$_3$ or Si$_2$N$_{21}$;
   (ii) a fifth ply disposed on the fourth ply having an optical thickness of 0.02 to 0.15$\lambda_0$ and being SiO$_2$;
   (iii) a sixth ply disposed on the fifth ply having an optical thickness of 0.20 to 0.50$\lambda_0$ and being a material selected from the group consisting of ZrO$_2$, HfO$_2$, Ti$_2$O$_3$, TiO$_2$, Ta$_2$O$_5$ or Si$_3$N$_4$; and
   (iv) a seventh ply disposed on the sixth ply having an optical thickness of from 0.20 to 0.30$\lambda_0$ and being of SiO$_2$.

9. A process of preparing a synthetic resin lens construction having a high refractive index and improved antireflective and mar resistant properties, comprising:
    forming a lens body of a cross-linked synthetic resin for forming a lens body having a refractive index $n_s$ of at least 1.55;
    depositing an antireflection coating on the surface of the lens body by first depositing an interposed antireflective layer having a refractive index n within the range represented by the formula:

$$\sqrt{n_s \times n_h} + \frac{|n_s - n_h|}{4} \geq n \geq \sqrt{n_s \times n_h} - \frac{|n_s - n_h|}{4}$$

to an optical film thickness of $\lambda/4$, wherein $\lambda$ denotes a wavelength in the range of from 450 nm to 650 nm on the surface of the lens body and depositing a hard coat layer of a dielectric substance having a refractive index $n_h$ on the surface of the antireflective layer.

10. The process of preparing a synthetic lens construction of claim 9, including the step of forming the lens body by radical polymerization of a mixed monomer solution of from about 30 to 50 parts by weight of styrene, 40 to 70 parts by weight of 2,2-bis[3,5-dibromo-4-(2-methacryloyloxyethoxy)phenyl]propane, 0.01 to 2.0 parts by weight of an ultraviolet light absorber, and 0.01 to 2.0 parts by weight of a light stabilizer.

11. The process of preparing a synthetic lens construction of claims 9 or 10, further including a step of depositing an outer antireflection layer on the outer surface of the hard coat layer.

12. The process of preparing a synthetic resin lens construction of claim 11, wherein the antireflection layers are formed by vacuum deposition.

* * * * *